March 18, 1924.
H. D. JAMES
1,486,901
MOTOR CONTROL SYSTEM
Filed March 13, 1920
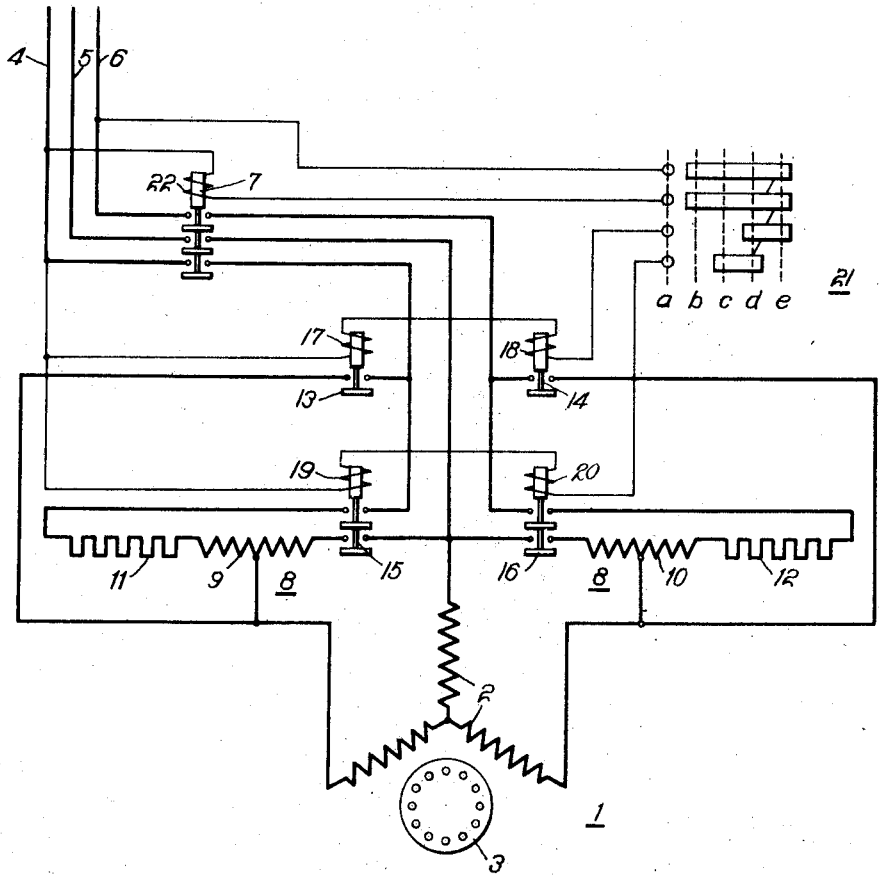
WITNESSES:
INVENTOR
Henry D. James
BY
ATTORNEY Patented Mar. 18, 1924.

1,486,901

UNITED STATES PATENT OFFICE.

HENRY D. JAMES, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed March 13, 1920. Serial No. 365,466.

*To all whom it may concern:*

Be it known that I, HENRY D. JAMES, a citizen of the United States, and a resident of Edgewood Park, in the county of Allegheny and State of Pennsylvania, have invented a new and useful Improvement in Motor-Control Systems, of which the following is a specification.

My invention relates to motor-control systems, and particularly to such systems as embody induction motors and auto transformers for starting the same.

One object of my invention is to provide means for protecting auto-transformer coils from a heavy rush of current at the moment of starting the operation of electric motors.

A second object of my invention is to provide means for protecting auto-transformer coils when they are short-circuited during the time that both the auto-transformer and the line conductors are connected directly to an electric motor.

Resistors have been employed, heretofore, for protecting auto-transformer coils from being damaged when short-circuited during the interval that both the line conductors and the auto-transformer are directly connected to the motor, but such resistors have been connected between low-tension terminals of the auto-transformer and the motor.

According to my invention, I place a resistor in series with an auto-transformer coil and between it and the source of energy. The arrangement of the controlling switches is such that the resistor accomplishes the two objects which I have set forth. The employment of the resistors in the manner described also permits the starting of electric motors without opening the primary circuits.

For a better understanding of my invention reference should now be had to the single figure of the accompanying drawing, in which a three-phase induction motor 1 has primary windings 2 and a rotor 3 of the well-known squirrel-cage type. Line conductors 4, 5 and 6 supply energy to the motor, the line connections being controlled by a triple-pole switch 7.

An auto-transformer 8 comprises coils 9 and 10 that are connected in circuit with the motor in starting the latter. Resistors 11 and 12 are in series with the coils 9 and 10. The circuits, comprising the coils 9 and 10 and the resistors 11 and 12, are controlled by switches 13, 14, 15 and 16, that are provided with actuating coils 17, 18, 19 and 20, respectively.

The operation of the several switches is controlled by a master switch 21. When the master switch occupies position "*a*", in which it is illustrated, the control circuits are not energized, and the circuits of the motor and the auto-transformer are open at the respective controlling switches.

When the master switch 21 is actuated to position "*b*", an actuating coil 22 is energized to close the line switch 7. When the master switch occupies position "*c*", the actuating coils 19 and 20 of switches 15 and 16 are energized to close the latter. The coils 9 and 10 are respectively connected between pairs of line conductors, the resistors 11 and 12 being in series with the coils 9 and 10 respectively.

The circuits are now arranged for starting the motor, the primary winding 2 being connected to intermediate terminals of the coils 9 and 10 whereby the motor is supplied with energy at low voltage. The resistors 11 and 12 prevent a heavy rush of current through the coils 9 and 10, when the switches 15 and 16 are closed.

When the motor has accelerated to a sufficiently high speed, the master switch 21 is actuated to position "*d*". Switches 13 and 14 are closed to connect the line conductors, directly to the motor windings 2.

Under these conditions, which are temporary during the period of transition from starting to running connections, portions of the coils 9 and 10 are short-circuited through the respective resistors 11 and 12. If preventive means were not employed, a heavy rush of current would traverse these portions upon the closing of switches 13 and 14. The resistors 11 and 12, however, effectually prevent the occurrence of such abnormal conditions. The second object of my invention is thus accomplished since the resistors 11 and 12 prevent injury to the short-circuited portions of the transformer coils 9 and 10.

The above conditions obtain only while the master switch is actuated by a continuous motion through position "*d*". When the master switch is in its final operative position "e", switches 15 and 16 open to disconnect the auto-transformer 8 from the line conductors 4, 5 and 6 and the circuits are arranged for normal operation of the motor.

It will be apparent to one skilled in the art that the employment of resistors in the relation described above is of particular advantage and of special utility in that, in addition to their functioning as protective devices for the auto-transformer 8, they permit the motor to be started and accelerated to normal speed without opening the primary circuits of the motor.

My improved system of control is especially applicable to motors in which a high initial torque is desirable, such, for example, as railway motors.

While I have shown my invention in a preferred form, it is possible to make slight modifications embodying the same principle. I desire, therefore, that my invention shall be limited only by the scope of the appended claims.

I claim as my invention:

1. In a motor-control system, the combination with an electric motor, a supply circuit, and an auto-transformer, of a resistor connected in series with said auto-transformer and between said supply circuit and said auto-transformer.

2. In a motor-control system, the combination with an induction motor, a supply circuit and an auto-transformer, of means for controlling said auto-transformer circuit, and a resistor connected in series with said supply circuit and said auto-transformer, upon its primary side.

3. In a motor-control system, the combination with an electric motor, a supply circuit, and an auto-transformer, of means for connecting a portion of said auto-transformer in a closed circuit, and means for limiting the value of current traversing said auto-transformer when starting the said motor and during the interval in which a portion of said auto-transformer is close-circuited.

4. In a motor-control system, the combination with an electric motor, a supply circuit, and an auto-transformer, of a resistor electrically connected to a primary terminal of said auto-transformer and to said supply circuit, and means whereby said resistor and said auto-transformer may be disconnected after the motor is in operation and said line conductors are directly connected to the said motor.

5. In a motor-control system, the combination with a source of energy, an alternating-current motor, an auto-transformer, and a plurality of resistors, of means for successively connecting said resistors, said auto-transformer and said motor in series relation to said source, simultaneously connecting said source directly to said motor and close-circuiting portions of the coils of said auto-transformer and said resistors, and then disconnecting said auto-transformer and said resistors from the system.

6. In a motor-control system, the combination with an electric induction motor, a supply circuit, and an auto-transformer, of a resistor electrically connected to a primary terminal of said auto-transformer and to said supply circuit, and means whereby said resistor and said auto-transformer may be disconnected from said motor after it is in operation and said line conductors are directly connected to said motor.

7. In a motor-control system, the combination with an electric induction motor, a supply circuit, and an auto-transformer, of a resistor electrically connected to said supply circuit and to a primary terminal of said auto-transformer, and a plurality of switches for successively connecting said auto-transformer and said resistor in series with said motor, connecting said supply circuit directly to said motor and then disconnecting said auto-transformer and said resistor therefrom.

8. In a motor-control system, the combination with an electric motor, a supply circuit and an auto-transformer, of means for connecting said motor and said auto-transformer in series relation with said circuit, means for connecting said motor directly to said circuit, and means for independently disconnecting said auto-transformer from said motor.

9. In a motor-control system, the combination with an electric motor, a supply circuit, and an auto transformer, of a means for successively starting said motor, connecting said motor directly to said supply circuit and subsequently, at will, disconnecting said auto transformer from said motor without opening said supply circuit.

10. In a motor-control system, the combination with an electric motor, a supply circuit, and an auto-transformer, of a plurality of switches for controlling said motor whereby said auto-transformer and said resistor are connected to said motor during its initial operation and are disconnected at will from said motor after said motor is connected directly to said supply circuit.

11. In a motor-control system, the combination with an electric motor, a supply circuit, a line switch for opening and closing said supply-circuits, and an auto-transformer, of a resistor connected to a primary terminal of said auto-transformer and a plurality of switches for connecting the auto-transformer and resistor in series with said motor after said line switch has been closed and for disconnecting them after the motor has been connected directly to said supply circuit without opening said line switch.

12. In a motor-control system, the combination with an electric motor, a supply circuit, and an auto-transformer, of a resistor connected in series with said auto-transformer, and a master switch for so controlling said system that said auto-transformer and said resistor may be connected in series with said motor when said switch is in its starting position, said motor connected directly to said supply circuit when said master switch is in its intermediate position and said resistor and said auto transformer are disconnected from said system when said motor is in its running position.

In testimony whereof, I have hereunto subscribed my name this 5th day of March, 1920.

HENRY D. JAMES.